United States Patent
Fujisawa et al.

(10) Patent No.: US 11,085,397 B2
(45) Date of Patent: Aug. 10, 2021

(54) AIRCRAFT COMPONENT AND GAS TURBINE ENGINE FOR AIRCRAFT

(71) Applicant: MITSUBISHI HEAVY INDUSTRIES AERO ENGINES, LTD., Aichi (JP)

(72) Inventors: Ryutaro Fujisawa, Tokyo (JP); Tomoyuki Onishi, Tokyo (JP); Yasuyuki Uetsuki, Tokyo (JP); Tadayuki Hanada, Aichi (JP); Yohei Fujimoto, Aichi (JP); Takafumi Ota, Aichi (JP)

(73) Assignee: MITSUBISHI HEAVY INDUSTRIES AERO ENGINES, LTD., Aichi (JP)

(*) Notice: Subject to any disclaimer, the term of this patent is extended or adjusted under 35 U.S.C. 154(b) by 188 days.

(21) Appl. No.: 16/073,386

(22) PCT Filed: May 17, 2016

(86) PCT No.: PCT/JP2016/064604
§ 371 (c)(1),
(2) Date: Jul. 27, 2018

(87) PCT Pub. No.: WO2017/134844
PCT Pub. Date: Aug. 10, 2017

(65) Prior Publication Data
US 2019/0032517 A1    Jan. 31, 2019

(30) Foreign Application Priority Data
Feb. 4, 2016   (JP) .................. JP2016-019996

(51) Int. Cl.
*F02K 1/82*   (2006.01)
*F02C 7/20*   (2006.01)
(Continued)

(52) U.S. Cl.
CPC .............. *F02K 1/82* (2013.01); *F01D 25/24* (2013.01); *F02C 7/00* (2013.01); *F02C 7/20* (2013.01);
(Continued)

(58) Field of Classification Search
CPC ..... F01D 25/24; F02C 7/00; F02C 7/20; F02K 3/06; F02K 1/82
See application file for complete search history.

(56) References Cited

U.S. PATENT DOCUMENTS 8,511,089 B2 *  8/2013  Bastnagel ............... F23R 3/002
                                                  60/752
2003/0131603 A1 * 7/2003 Bolender ............... F23R 3/002
                                                  60/772
(Continued)

FOREIGN PATENT DOCUMENTS

EP          1329669 A2     7/2003
JP        S49-130206 U    11/1974
(Continued)

OTHER PUBLICATIONS

Extended European Search Report for European Application No. 16889328.7 dated Dec. 10, 2018; 7pp.
(Continued)

*Primary Examiner* — Woody A Lee, Jr.
(74) *Attorney, Agent, or Firm* — Hauptman Ham, LLP (57) ABSTRACT

An aircraft component is used in a gas turbine engine for an aircraft. The aircraft component includes an annular part having an outer peripheral surface, and a boss part protruding from the outer peripheral surface of the annular part in a radial direction. In the boss part, at least two through-holes are formed to penetrate the boss part in the radial direction
(Continued)

at predetermined intervals. In the boss part around the two through-holes, a cut-out part where a part of the boss part is cut out is formed.

11 Claims, 5 Drawing Sheets

(51) Int. Cl.
  *F01D 25/24* (2006.01)
  *F23R 3/60* (2006.01)
  *F02K 3/06* (2006.01)
  *F02C 7/00* (2006.01)

(52) U.S. Cl.
  CPC .................. *F02K 3/06* (2013.01); *F23R 3/60* (2013.01); *F05D 2220/323* (2013.01); *F05D 2240/14* (2013.01); *F05D 2260/30* (2013.01); *F05D 2260/31* (2013.01); *F05D 2260/941* (2013.01)

(56) References Cited

U.S. PATENT DOCUMENTS

| | | | |
|---|---|---|---|
| 2013/0227930 A1* | 9/2013 | Pegan, Jr. | ............. F01D 25/162 |
| | | | 60/224 |
| 2016/0201490 A1* | 7/2016 | Scott | ....................... F01D 25/24 |
| | | | 415/213.1 |
| 2016/0369656 A1* | 12/2016 | Mulcaire | ................ B22F 3/1258 |
| 2018/0010524 A1* | 1/2018 | Peace | ..................... F01D 25/24 |

FOREIGN PATENT DOCUMENTS

| | | |
|---|---|---|
| JP | H7-208110 A | 8/1995 |
| JP | H11-257016 A | 9/1999 |
| JP | 2002-228386 A | 8/2002 |
| JP | 2003-232520 A | 8/2003 |

OTHER PUBLICATIONS

International Search Report and Written Opinion in PCT/JP2016/064604, dated Aug. 9, 2016, 14pp.

* cited by examiner

AIRCRAFT COMPONENT AND GAS TURBINE ENGINE FOR AIRCRAFT

RELATED APPLICATIONS

The present application is a National Phase of International Application Number PCT/JP2016/064604 filed May 17, 2016 and claims priority based on Japanese based Application Number 2016-019996 filed Feb. 4, 2016.

FIELD

The present invention relates to an annular aircraft component including a boss part and to a gas turbine engine for an aircraft.

BACKGROUND

Conventionally, there has been known a heat exchanger that includes a boss part protruding from an outer wall of a tank main body for combining other components (for example, refer to Patent Literature 1). In this heat exchanger, the boss part is integrally formed with a reinforcing rib extending from a base side of the boss part to a part near the top of the tank main body and partly increasing thickness of the base side of the tank main body and the boss part.

CITATION LIST

Patent Literature

Patent Literature 1: Japanese Patent Application Laid-open No. 2002-228386

SUMMARY

Technical Problem

The boss part in Patent Literature 1 reduces a change due to thermal stress by providing the reinforcing rib to improve rigidity of the boss part. However, providing the reinforcing rib to improve rigidity of the boss part causes an increase in weight of a component. For example, when the boss part is applied as a component to an aircraft component, weight of an aircraft is increased.

It is an object of the present invention to provide an aircraft component and a gas turbine engine for an aircraft, which are capable of preventing an increase in weight, reducing stress, and extending product life.

Solution to Problem

An aircraft component of the present invention is an aircraft component used in a gas turbine engine for an aircraft. The aircraft component includes an annular part having an outer peripheral surface, and a boss part protruding from the outer peripheral surface of the annular part in a radial direction. In the boss part, at least two through-holes are formed to penetrate the boss part in the radial direction at predetermined intervals. In the boss part around the two through-holes, a cut-out part where a part of the boss part is cut out is formed.

With this configuration, stress generated between the two through-holes can be dispersed through the cut-out part formed. In a part where stress concentration is generated, the cut-out part enables stress to be dispersed. Thus, stress on the part where stress concentration is generated can be reduced, and product life can be extended.

It is preferable that the cut-out part is a recessed part that is formed from a peripheral edge of the boss part toward a space between the two through-holes.

With this configuration, stress generated between the two through-holes can be dispersed through the recessed part formed.

It is preferable that the recessed part is formed into a semicircular shape in the outer peripheral surface.

With this configuration, simple processing can form the recessed part. In addition, stress can be appropriately dispersed and can be reduced more by forming the recessed part into a semicircular shape.

It is preferable that one of the two through-holes is an aperture, and the other is a bolt-hole having an aperture area smaller than the aperture, and a radius of the recessed part is the same as a radius of the bolt-hole With this configuration, stress can be appropriately dispersed and can be reduced more by making a radius of the recessed part the same as that of the bolt-hole.

It is preferable that the cut-out part is a hollow part that is hollow from an outer surface of the boss part.

With this configuration, a thermal capacity of the boss part can be reduced by providing the hollow part. Thus, a temperature of the boss part is likely to increase, and a temperature gradient between the inside and the outside of the boss part can be reduced.

It is preferable that a plate thickness of the boss part in which the cut-out part is formed is equal to or larger than a plate thickness of a thinnest part that is thinnest in the annular part.

With this configuration, even when the cut-out part is formed, rigidity of the boss part can be guaranteed. Thus, a decrease in rigidity of the boss part due to the cut-out part can be prevented.

It is preferable that the cut-out part is formed so that a sum of primary stress generated by a change in rigidity of the boss part and secondary stress generated by heat given to the boss part is minimized.

With this configuration, the cut-out part can be formed so that the sum of the primary stress and the secondary stress is minimized. Thus, the primary stress and the secondary stress can be reduced in a balanced manner.

A gas turbine engine for an aircraft of the present invention includes the aircraft component.

With this configuration, the aircraft component suitably reducing stress thereon can be employed, whereby reliability can be improved.

DESCRIPTION OF EMBODIMENTS

Embodiments according to the present invention will be described below in detail with reference to the accompanying drawings. It should be noted that the embodiments are not intended to limit the present invention. Components in the embodiments include components that can be replaced and are facilitated by the skilled person or substantially like components. In addition, components described below can be combined as appropriate. Furthermore, when there are a plurality of embodiments, each of the embodiments can be combined.

First Embodiment

Figure 1:
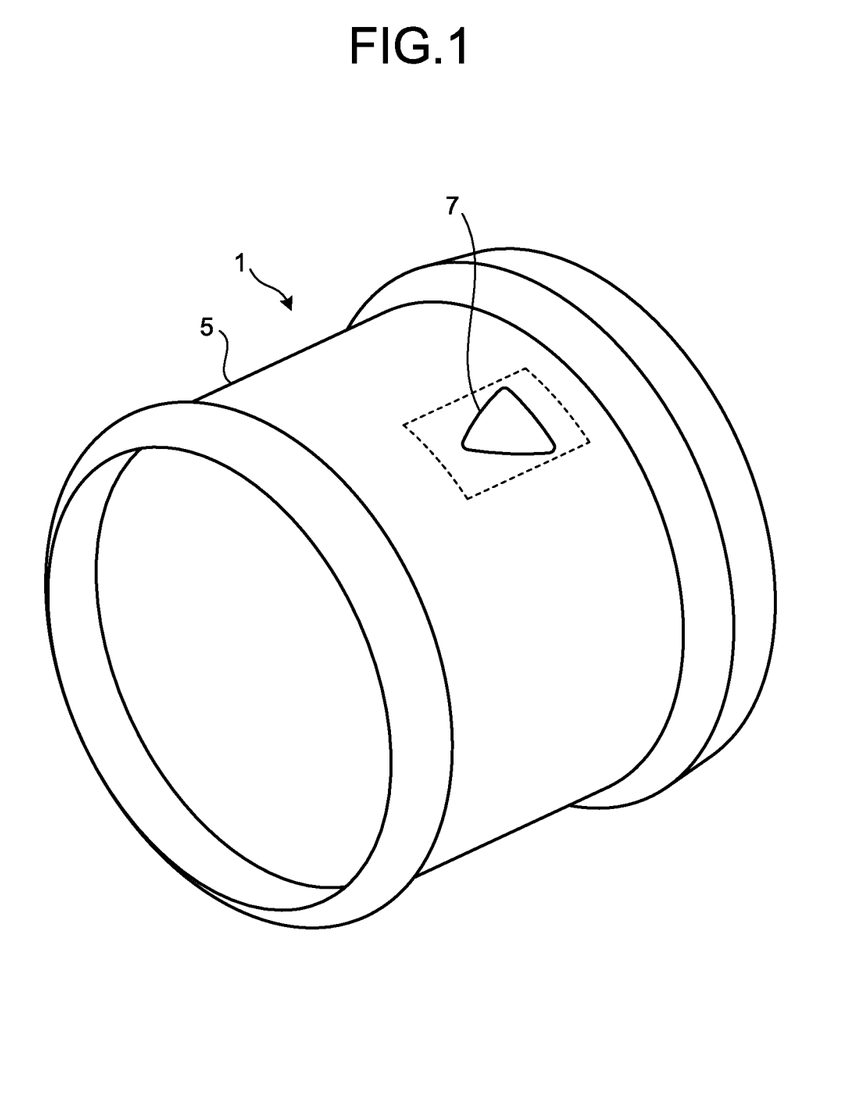
FIG. 1 is a perspective view schematically illustrating an aircraft component in accordance with a first embodiment.
Figure 2:
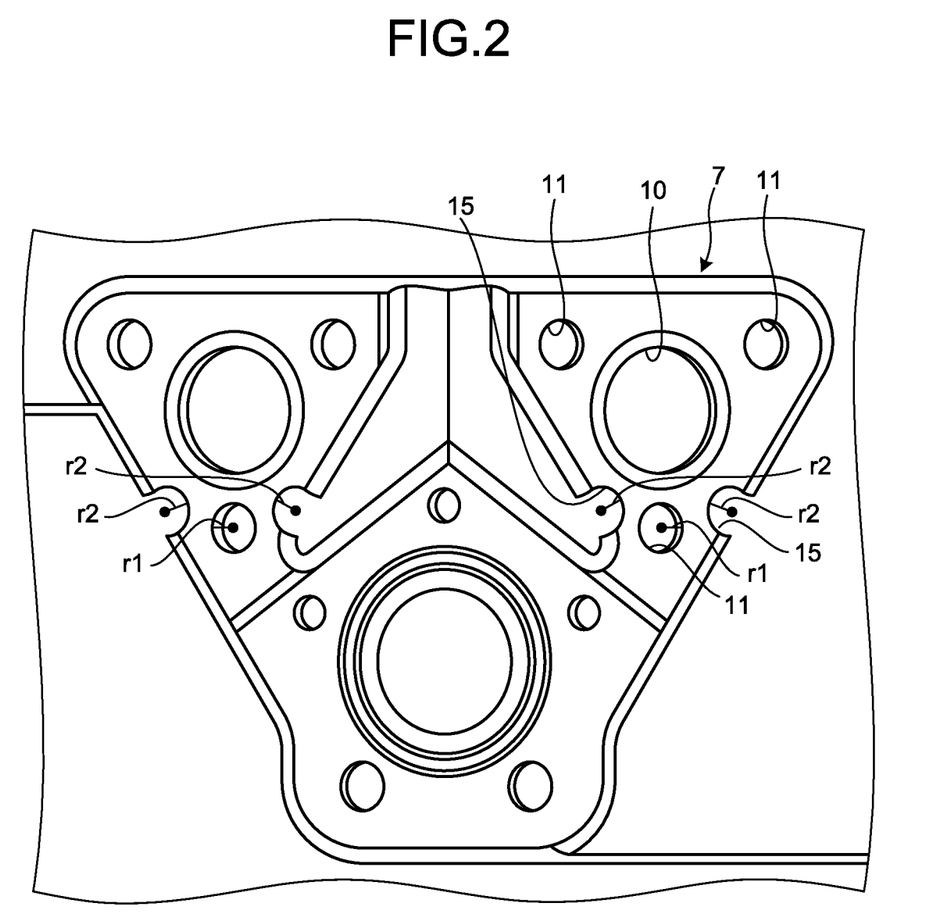
FIG. 2 is a plan view illustrating a boss part of the aircraft component in accordance with the first embodiment that is viewed from a radial direction.
Figure 3:
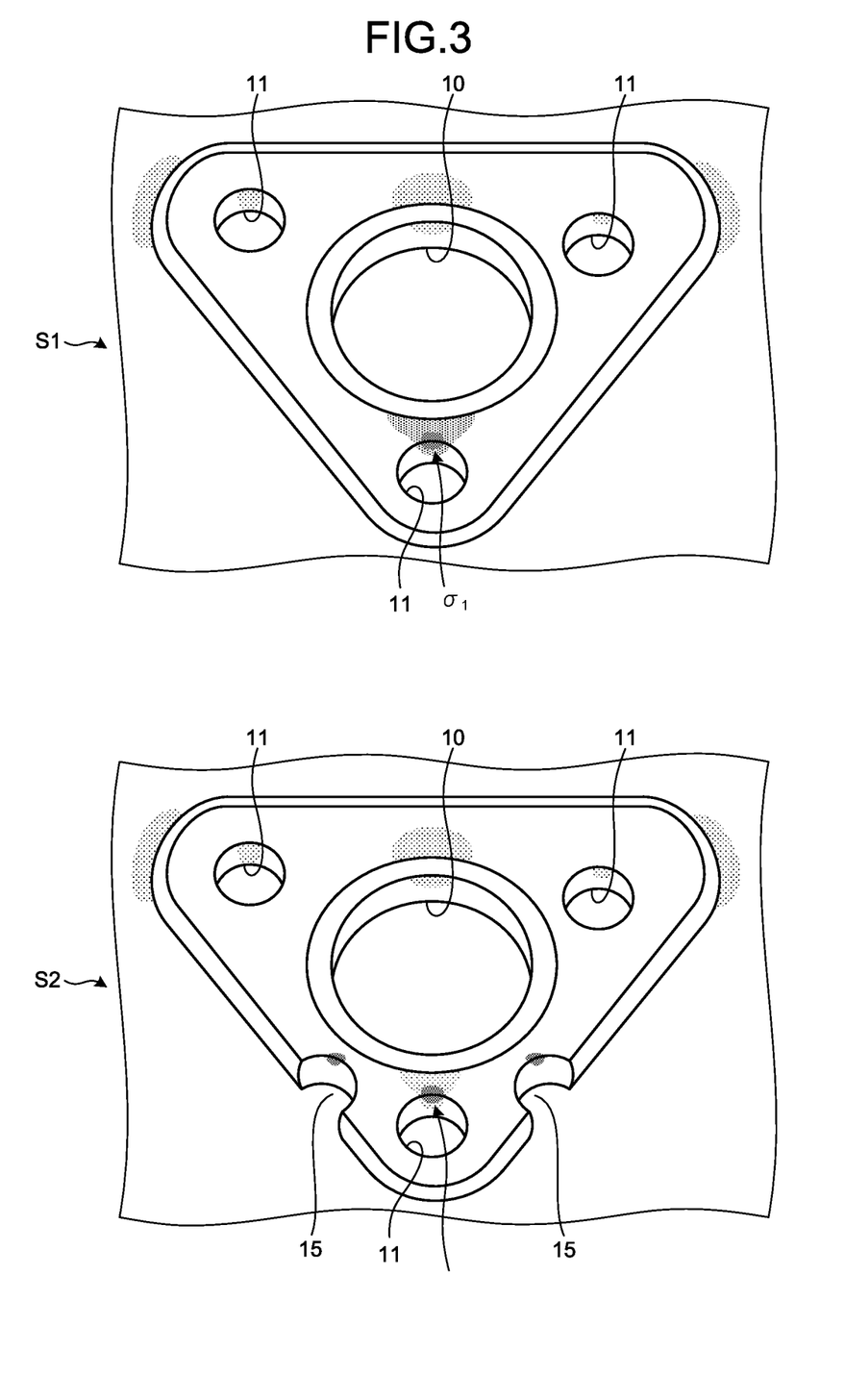
FIG. 3 is an explanatory drawing related to stress distribution of the aircraft component in accordance with the first embodiment.

An aircraft component according to a first embodiment is used in a gas turbine engine for an aircraft, and is, for example, a component forming a casing of a combustor. FIG. 1 is a perspective view schematically illustrating an aircraft component in accordance with the first embodiment. FIG. 2 is a plan view illustrating a boss part of the aircraft component in accordance with the first embodiment when viewed from a radial direction. FIG. 3 is an explanatory drawing related to stress distribution of the aircraft component in accordance with the first embodiment. The following describes a case when an aircraft component in the first embodiment is applied as an aircraft component 1 to a casing of a combustor, but this is not especially limiting. An aircraft component in the first embodiment may be applied to any aircraft component 1.

The aircraft component 1 includes an annular part 5 and a boss part 7. The annular part 5 is formed in an annular shape in a circumferential direction with a predetermined direction serving as an axial direction, and the boss part 7 is formed on an outer peripheral surface of the annular part 5. In the annular part 5, a temperature of the inside is higher, and a temperature of the outside is lower than that of the inside.

The boss part 7 is formed protruding from an outer peripheral surface of the annular part 5 to the outside in a radial direction. In the boss part 7, a circular aperture 10 penetrating the inside and the outside of the boss part 7 in a radial direction is formed, and an unillustrated duct is connected to this aperture 10. In the boss part 7 around the aperture 10, a plurality of bolt-holes 11 for fastening the duct to the aircraft component 1 are formed to penetrate the boss part 7 in a radial direction. Specifically, the three bolt-holes 11 are provided, and are triangularly arranged. The aperture 10 is formed at the center of the three bolt-holes 11. The boss part 7 is formed thicker than thickness of a thinnest part where a plate thickness of the annular part 5 is thinnest. The boss part 7 is formed continuously with another adjacent boss part 7.

In the boss part 7, between the aperture 10 and the predetermined bolt-hole 11, thermal stress is generated by difference in temperature between the inside and the outside of the annular part 5. Thus, in the boss part 7 around the aperture 10 and the predetermined bolt-hole 11, a recessed part 15 is formed as a cut-out part formed by cutting out a part of the boss part 7.

The recessed part 15 is formed from a peripheral edge serving as a contour of the boss part 7 toward a space between the aperture 10 and the predetermined bolt-hole 11. The recessed part 15 is formed by, for example, through milling, cutting the boss part 7 from the peripheral edge of the boss part 7 toward a space between the aperture 10 and the predetermined bolt-hole 11. The recessed part 15 is formed between the aperture 10 and the predetermined bolt-hole 11 in a predetermined direction (for example, an axial direction of the annular part 5) where the aperture 10 and the predetermined bolt-hole 11 face each other. The two recessed parts 15 are provided in an orthogonal direction orthogonal to the predetermined direction (for example, a circumferential direction of the annular part 5). The two recessed parts 15 are symmetrically arranged across a connection line that connects the center of the aperture 10 and the center of the predetermined bolt-hole 11.

Each of the recessed parts 15 is, in an outer peripheral surface of the annular part 5, when viewed from a radial direction, formed in a semicircular shape having a predetermined radius r2. The radius r2 of this recessed part 15 is the same as a radius of a cutting tool used, for example, through milling. In addition, the recessed part 15 has the radius r2 that is the same as a radius r1 of the bolt-hole 11.

In the recessed parts 15 formed in this manner, a plate thickness of the boss part 7 on which the recessed parts 15 are formed is the same as a plate thickness of the annular part 5 adjacent to the boss part 7. In other words, an outer peripheral surface of the annular part 5 and the bottom surface of the recessed parts 15 are a continuous surface. In addition, plate thickness of the boss part 7 on which the recessed parts 15 are formed is equal to or more than plate thickness of the thinnest part that is thinnest in the annular part 5.

The recessed parts 15 may be formed in the existing aircraft component 1 that has been already manufactured and operated, and may be formed in the newly manufactured aircraft component 1. This is not especially limiting.

With reference to FIG. 3, a comparison is made between stress distribution of the aircraft component 1 in the first embodiment and stress distribution of the conventional aircraft component 1. S1 illustrated in FIG. 3 indicates the conventional aircraft component 1 on which the recessed parts 15 are not formed. S2 illustrated in FIG. 3 indicates the aircraft component 1 in the first embodiment on which the recessed parts 15 are formed. The stress distribution of the aircraft component 1 illustrated in FIG. 3 is an analysis result obtained by finite element method (FEM) analysis.

As illustrated in S1 in FIG. 3, a part of the boss part 7 on which thermal stress is concentrated is a part between the aperture 10 and the predetermined bolt-hole 11, and has thermal stress $\sigma_1$ generated thereon. By contrast, as illustrated in S2 in FIG. 3, when the two recessed parts 15 are formed around the aperture 10 and the predetermined bolt-hole 11, thermal stress is dispersed to reduce thermal stress $\sigma_2$ on a part between the aperture 10 and the predetermined bolt-hole 11. In this case, it has been confirmed that the thermal stress $\sigma_2$ generated in the first embodiment is reduced by about 26% with respect to the conventional thermal stress $\sigma_1$.

As described above, according to the first embodiment, stress (thermal stress) generated between the aperture 10 and the bolt-hole 11 can be dispersed by forming the recessed parts 15. On a part where stress concentration is generated, stress can be dispersed by the recessed parts 15. Thus, stress on the part where stress concentration is generated can be reduced, and product life of the aircraft component 1 can be extended.

According to the first embodiment, the recessed parts 15 can be formed through simple milling by forming the recessed parts 15 into a semicircular shape. In addition, stress can be appropriately dispersed by forming the recessed parts 15 into a semicircular shape, and stress can be reduced more.

According to the first embodiment, stress can be appropriately dispersed by making the radius r2 of the recessed parts 15 the same as the radius r1 of the bolt-holes 11, and stress can be reduced more.

According to the first embodiment, even when the recessed parts 15 are formed, rigidity of the boss part 7 can be guaranteed. Thus, a decrease in rigidity of the boss part 7 due to the recessed parts 15 can be prevented.

According to the first embodiment, the aircraft component 1 suitably reducing stress thereon can be employed, whereby reliability of the aircraft gas turbine engine is improved.

Second Embodiment

Figure 4:
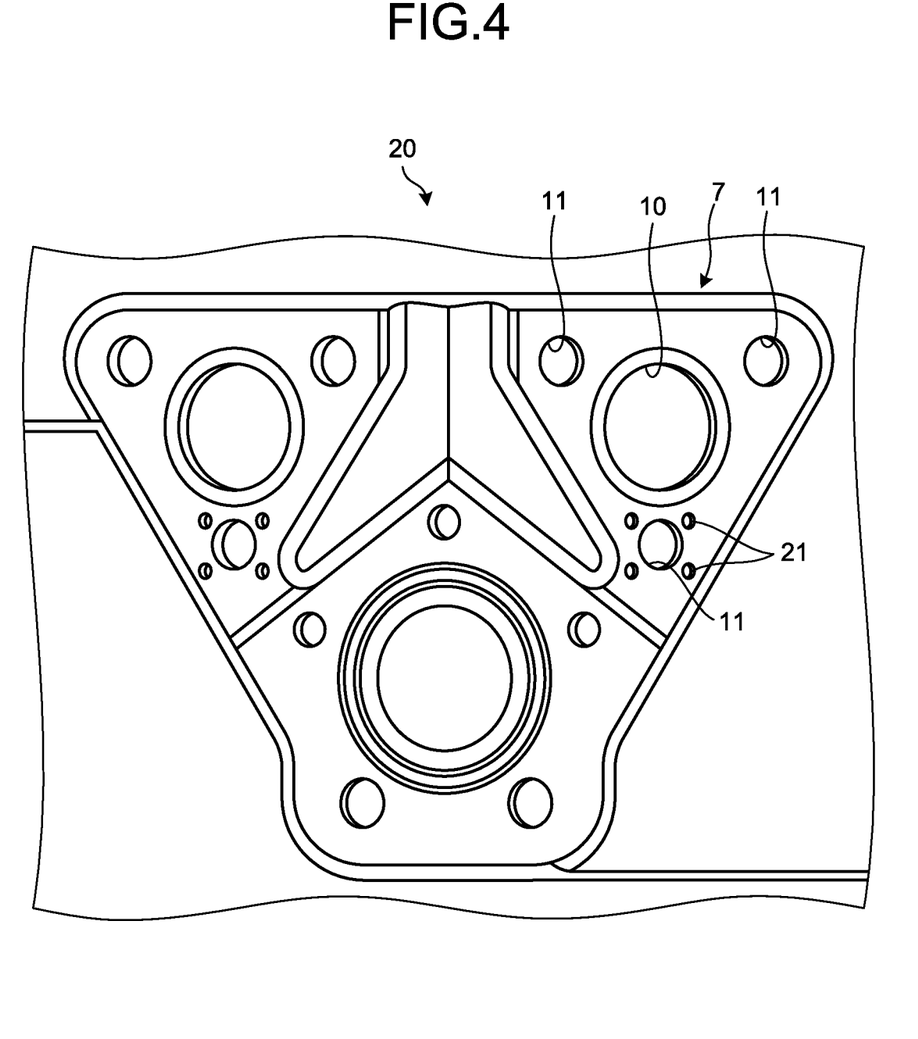
FIG. 4 is a plan view illustrating the boss part of an aircraft component in accordance with a second embodiment that is viewed from a radial direction.
Figure 5:
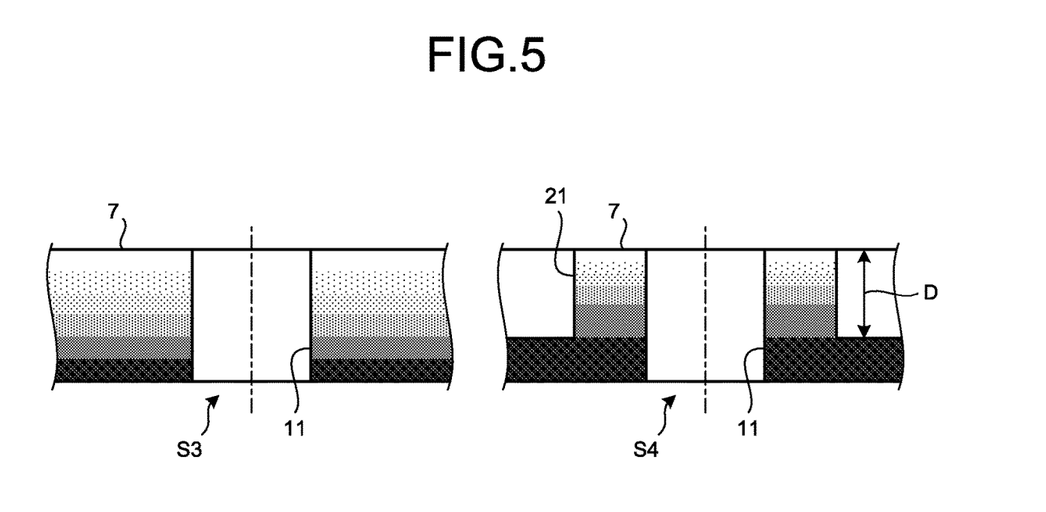
FIG. 5 is an explanatory drawing related to thermal distribution of the aircraft component in accordance with the second embodiment.

With reference to FIGS. 4 and 5, an aircraft component 20 according to a second embodiment will be described. In the second embodiment, in order to avoid overlapped description, a part different from that of the first embodiment will be described, and a part having the same configuration as that of the first embodiment will be described using like numerals. FIG. 4 is a plan view illustrating the boss part of the aircraft component in accordance with the second embodiment that is viewed from a radial direction. FIG. 5 is an explanatory drawing related to thermal distribution of the aircraft component in accordance with the second embodiment.

In the aircraft component 20 according to the second embodiment, in the boss part 7 around the aperture 10 and the predetermined bolt-hole 11, a hollow part 21 serving as a cut-out part where a part of the boss part 7 is cut out is formed.

The hollow part 21 is formed hollow from an outer surface of the boss part 7. This hollow part 21 is a bottomed hole that is formed by, for example, through boring processing, boring the boss part 7 from the outer surface of the boss part 7 to a predetermined depth D. The four hollow parts 21 are, centering on the predetermined bolt-hole 11, formed around the predetermined bolt-hole 11. Out of the four hollow parts 21, the two hollow parts 21 are formed between the aperture 10 and the predetermined bolt-hole 11 in a predetermined direction (for example, an axial direction of the annular part 5) where the aperture 10 and the predetermined bolt-hole 11 face each other. In addition, in an orthogonal direction orthogonal to the predetermined direction (for example, a circumferential direction of the annular part 5), the two hollow parts 21 are symmetrically arranged across a connection line that connects the center of the aperture 10 and the center of the predetermined bolt-hole 11. Out of the four hollow parts 21, the remaining two hollow parts 21 are formed on a side opposite to the aperture 10 across the bolt-hole 11, and are at the same position as that of the other two hollow parts 21 in a predetermined direction (an axial direction of the annular part 5).

Each of the hollow parts 21 is, in an outer peripheral surface of the annular part 5 that is viewed from a radial direction, formed in a circular shape having a predetermined radius. The radius of the hollow part 21 is smaller than a radius of the bolt-hole 11.

In the hollow parts 21 formed in this manner, a plate thickness of the boss part 7 on which the hollow parts 21 are formed is equal to or more than a plate thickness of the thinnest part that is thinnest in the annular part 5.

The hollow parts 21 may be formed in the existing aircraft component 20 that has been already manufactured and operated, and may be formed in the newly manufactured aircraft component 20. This is not especially limiting.

When such hollow parts 21 are formed, a thermal capacity of the boss part 7 around the aperture 10 and the predetermined bolt-hole 11 is reduced. Thus, the boss part 7 according to the second embodiment has thermal distribution illustrated in FIG. 5.

With reference to FIG. 5, a comparison is made between thermal distribution of the aircraft component 20 in the second embodiment and thermal distribution of the conventional aircraft component 20. S3 illustrated in FIG. 5 indicates the conventional aircraft component 20 on which the hollow parts 21 are not formed. S4 illustrated in FIG. 5 indicates the aircraft component 20 in the second embodiment in which the hollow parts 21 are formed.

As illustrated in S3 in FIG. 5, a part of the boss part 7 on which thermal stress is concentrated is a part between the aperture 10 and the predetermined bolt-hole 11. The boss part 7 around the bolt-holes 11 has a predetermined temperature gradient in which a temperature of the inside (lower side in FIG. 5) is high and a temperature of the outside (upper side in FIG. 5) is low. By contrast, as illustrated in S4 in FIG. 5, when the four hollow parts 21 are formed around the aperture 10 and the predetermined bolt-hole 11, a thermal capacity around the boss part 7 is reduced, and a temperature of the boss part 7 is likely to increase as compared with the conventional one. Thus, the boss part 7 around the bolt-holes 11 has a lower temperature gradient as compared with the conventional one, and reduces difference in temperature between the inside and the outside.

As described above, according to the second embodiment, a thermal capacity of the boss part 7 can be reduced by providing the hollow parts 21, and a temperature of the boss part 7 is likely to increase to reduce a temperature gradient of the boss part 7. Thus, difference in temperature between the inside and the outside of the boss part 7 can be reduced, and stress (thermal stress) generated between the aperture 10 and the bolt-hole 11 can be reduced, thereby extending product life of the aircraft component 1.

The first and second embodiments are described by applying to the aperture 10 and the predetermined bolt-hole 11, but the aperture 10 and the predetermined bolt-hole 11 may be two through-holes that penetrate the boss part 7. The position at which the recessed parts 15 or the hollow parts 21 are provided is not especially limited if the position is on a part where thermal stress is generated.

The number of and the position of the recessed parts 15 and the hollow parts 21 are not especially limited, and may be any number and any position if the number and the position can reduce thermal stress.

Third Embodiment

Figure 6:
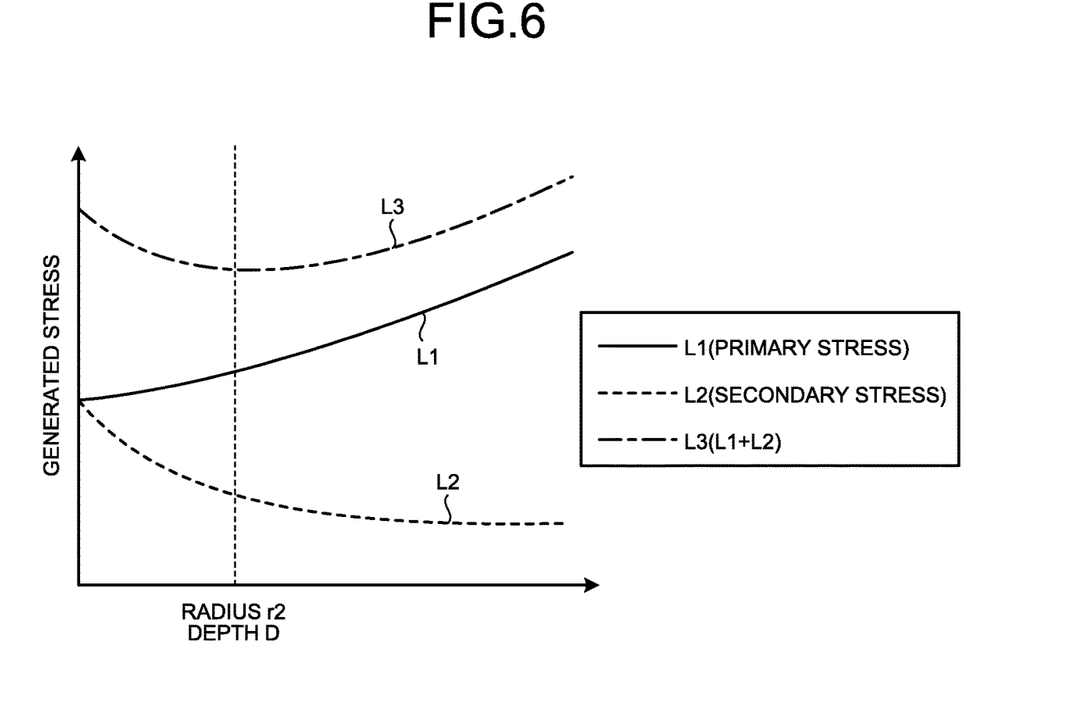
FIG. 6 is an explanatory drawing related to stress of the aircraft components in accordance with a third embodiment.

With reference to FIG. 6, the aircraft components 1 and 20 according to a third embodiment will be described. In the third embodiment, in order to avoid overlapped description, a part different from those of the first and second embodiments will be described, and a part having the same configuration as those of the first and second embodiments will be described using like numerals. FIG. 6 is an explanatory drawing related to stress of the aircraft components in accordance with the third embodiment.

In the aircraft components 1 and 20 according to the third embodiment, the recessed parts 15 or the hollow parts 21 formed in the aircraft components 1 and 20 according to the first and second embodiments are formed so that the sum of primary stress and secondary stress is minimized. The primary stress indicates stress generated by a change in rigidity of the boss part 7 in which the recessed parts 15 or the hollow parts 21 are formed, and is L1 illustrated in FIG. 6. In other words, as the radius r2 of the recessed parts 15 is larger or the depth D of the hollow parts 21 is deeper, rigidity of the boss part 7 is reduced. Thus, the primary stress L1 generated in the boss part 7 is larger. The secondary stress indicates thermal stress generated by heat that is given to the boss part 7 on which the recessed parts 15 or the hollow parts 21 are formed, and is L2 illustrated in FIG. 6. In other words, as the radius r2 of the recessed parts 15 is larger or the depth D of the hollow parts 21 is deeper, dispersion of stress in the boss part 7 is improved. Thus, the secondary stress L2 generated in the boss part 7 is smaller. L3 illustrated in FIG. 6 indicates the sum of the primary stress L1 and the secondary stress L2. In the third embodiment, the recessed parts 15 or the hollow parts 21 are formed so that the radius r2 of the recessed parts 15 has the minimized sum L3 or the depth D of the hollow parts 21 has the minimized sum L3.

As described above, according to the third embodiment, the recessed parts 15 or the hollow parts 21, which serve as cut-out parts, can be formed so that the sum L3 of the primary stress L1 and the secondary stress L2 is minimized. Thus, the primary stress L1 and the secondary stress L2 can be reduced in a balanced manner.

The third embodiment describes a change in the primary stress L1 and the secondary stress L2 using the radius r2 of the recessed parts 15 and the depth D of the hollow parts 21 as parameters, but the parameters for changing the primary stress L1 and the secondary stress L2 are not limited to the radius r2 and the depth D. For example, the parameter for changing the primary stress L1 and the secondary stress L2 may be a depth of the recessed parts 15 from an outer surface of the boss part 7. In this case, the recessed parts 15 are formed at a depth where the sum L3 is minimized. Similarly, the parameter for changing the primary stress L1 and the secondary stress L2 may be a diameter of the hollow parts 21. In this case, the hollow parts 21 are formed at a diameter where the sum L3 is minimized.

REFERENCE SIGNS LIST

1 Aircraft component
5 Annular part
7 Boss part
10 Aperture
11 Bolt-hole
15 Recessed part
20 Aircraft component (Second embodiment)
21 Hollow part

The invention claimed is:

1. An aircraft component used in a gas turbine engine for an aircraft, the aircraft component comprising:
an annular part having an outer peripheral surface; and
a boss part protruding from the outer peripheral surface of the annular part in a radial direction, wherein
in the boss part, at least one first through-hole and at least two second through-holes are formed to penetrate the boss part in the radial direction at predetermined intervals,
the at least one first through-hole is arranged between the at least two second through-holes,
at a first portion of the boss part closer to one of the at least two second through-holes than the other of the at least two second through-holes, a recessed part is formed from a peripheral edge of the boss part toward a space between the at least one first through-hole and the one of the at least two second through-holes, and
at a second portion of the boss part closer to the other of the at least two second through-holes than the one of the at least two second through-holes, the recessed part is not formed.

2. The aircraft component according to claim 1, wherein the recessed part is formed into a semicircular shape in the outer peripheral surface.

3. The aircraft component according to claim 1, wherein
the at least one first through-hole is an aperture, and each of the at least two second through-holes is a bolt-hole having an aperture area smaller than the aperture, and
a radius of the recessed part is the same as a radius of the bolt-hole.

4. An aircraft component used in a gas turbine engine for an aircraft, the aircraft component comprising:
an annular part having an outer peripheral surface; and
a boss part protruding from the outer peripheral surface of the annular part in a radial direction, wherein
in the boss part, at least one first through-hole and at least two second through-holes are formed to penetrate the boss part in the radial direction at predetermined intervals,
in the boss part around a perimeter of one of the two second through-holes, a hollow part that is hollow from an outer surface of the boss part is formed, and
a plate thickness of the boss part in which the hollow part is formed is equal to or larger than a plate thickness of a thinnest part that is thinnest in the annular part.

5. The aircraft component according to claim 4, wherein the hollow part is formed so that a sum of primary stress generated by a change in rigidity of the boss part and secondary stress generated by heat given to the boss part is minimized.

6. A gas turbine engine for an aircraft comprising the aircraft component according to claim 4.

7. The aircraft component according to claim 1 wherein a plate thickness of the boss part in which the recessed part is formed is equal to or larger than a plate thickness of a thinnest part that is thinnest in the annular part.

8. The aircraft component according to claim 1, wherein the recessed part is formed so that a sum of primary stress generated by a change in rigidity of the boss part and secondary stress generated by heat given to the boss part is minimized.

9. A gas turbine engine for an aircraft comprising the aircraft component according to claim 1.

10. The aircraft component according to claim 4, wherein the hollow part is a bottomed hole.

11. An aircraft component used in a gas turbine engine for an aircraft, the aircraft component comprising:
an annular part having an outer peripheral surface; and
a boss part protruding from the outer peripheral surface of the annular part in a radial direction, wherein
in the boss part, at least one first through-hole and at least two second through-holes are formed to penetrate the boss part in the radial direction at predetermined intervals,
the at least one first through-hole is arranged between the at least two second through-holes, and
at a portion of the boss part closer to one of the at least two second through-holes than the other of the at least two second through-holes, a single recessed part is formed from a peripheral edge of the boss part toward a space between the at least one first through-hole and the one of the at least two second through-holes.

\* \* \* \* \*